Feb. 20, 1934.  T. R. ROSE ET AL  1,947,493
COATING OF MACHINE ELEMENTS
Filed July 17, 1931
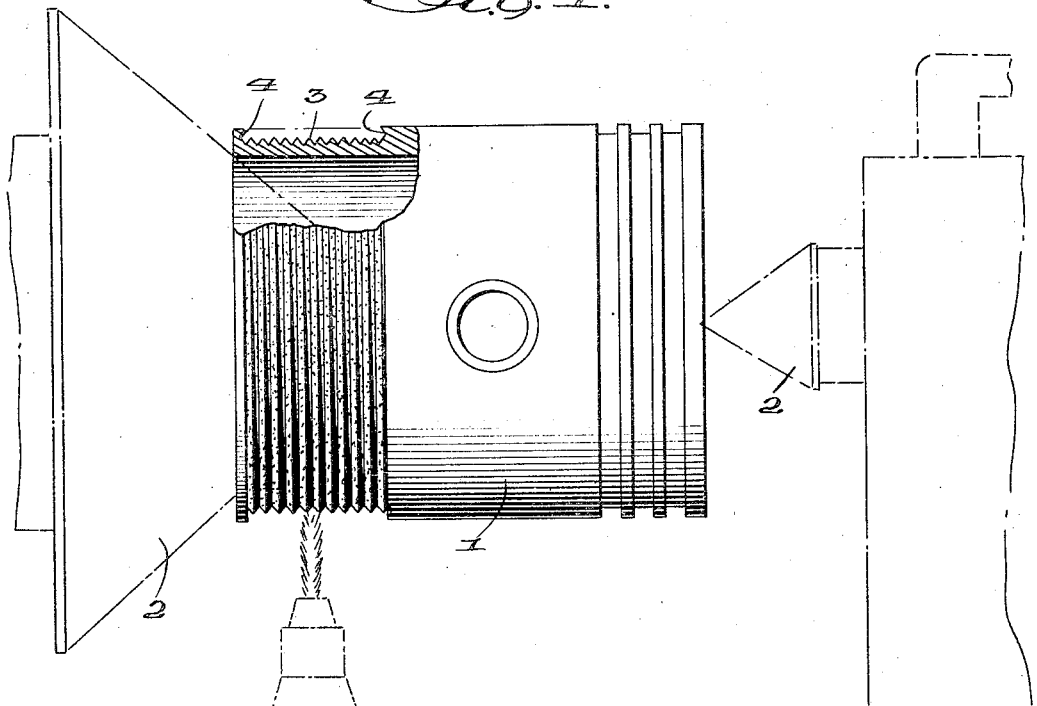
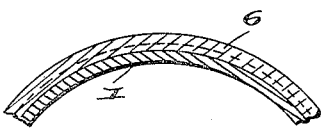

Patented Feb. 20, 1934

1,947,493

UNITED STATES PATENT OFFICE 1,947,493

COATING OF MACHINE ELEMENTS

Thomas Roy Rose and Herman L. Engle, Calexico, Calif., assignors to Rose-Engle Company, a corporation Application July 17, 1931. Serial No. 551,522

5 Claims. (Cl. 22—203)

This invention relates to an improvement in coating of machine elements, and more particularly to the spraying of such machine elements as pistons, crank-shafts, and bearings, with spring-steel or the like, in order to impart a hard, smooth surface thereto.

It is particularly applicable to alloy machine elements which are light in weight but soft and wear out easily. By inlaying a steel band onto the surface of such machine elements, a hard, smooth surface is obtained which will double the life of the elements and, in the case of an alloy piston, will also save the cylinder walls.

In the accompanying drawing:

Fig. 1 is a diagrammatic view showing the spraying of a piston; and

Fig. 2 is an enlarged sectional view therethrough.

In carrying out the process, it is described in connection with an alloy piston, although it may apply equally well to other machine elements, such as crank-shafts, main bearings or the like. The piston, designated generally by the numeral 1, is centered in lathe supports 2, and which piston first has a portion of its surface cut away by means of a tool, which cuts a V-shaped groove therein, as shown in Fig. 1.

The tool is set so that it breaks the metal slightly, leaving the pores of the metal open and rough, to give an adhering surface for the metal to be sprayed thereon. This V-shaped groove is designated by the numeral 3 and at its opposite ends the metal is undercut as at 4 to also cause an adherence between the coating and the piston.

After the groove 3 has been formed in the surface of the piston, the latter is ready to receive the metal to be sprayed thereon. This is done by rotating the piston in the lathe and mounting a spraying apparatus or depositor, designated generally by the numeral 5, on a tool post, which is in turn mounted on a carriage, to move the depositor lengthwise of the piston.

This depositor 5 may be of any well-known form for depositing metal in a finely divided form on the surface of the piston. Spring steel wire may be used in the depositor, such as piano wire or any high carbon steel wire that will harden when cooled quickly.

The adhering layer is designated by the numeral 6 in Fig. 2, and after it has been built up on the piston, it is ground down to the required size, and if desired the grinding may be such as to permit chromium plating.

This process has been tried and tested over an extended period of time and has been found to give very superior results, requiring substantially less repacking than is ordinarily found necessary.

We claim:

1. A process of inlaying a metallic band in the external surface of a metallic machine element, comprising rotating an element in contact with a cutting tool arranged to break the metal in forming a groove in the surface, the bottom surface of which groove is abnormally broken and rough, and building metal in the groove by spraying.

2. A process of inlaying a metallic band in the external surface of a metallic machine element, comprising rotating said element while in contact with a cutting tool which forms an external groove in the periphery of the element, which groove thus formed has the bottom surface thereof broken and rough for ready adhesion of sprayed metal, and building metal in the groove by spraying.

3. A process of inlaying a metallic band in the external surface of a machine element comprising rotating said element in contact with a cutting tool so set as to form a groove in the surface with a porous or broken bottom wall, undercutting the edges of said groove and thereafter and during the rotation of said element spraying metal in the groove to adhere to the porous surface and form a band in the groove.

4. A process of inlaying a metallic band in the surface of a metallic machine element, comprising arranging said element in contact with a cutting tool, causing relative motion between the contacting surface of said element and tool with said tool arranged to break the metal in forming a groove in the surface, the bottom surface of which groove being abnormally broken and rough, and building metal in the groove by spraying.

5. A process of inlaying a metallic band in the surface of a metallic machine element, comprising arranging said element in contact with a cutting element, causing turning motion of one of said elements about an axis while the first-mentioned element has its surface in contact with the cutting element, and with said cutting element arranged to break the metal in forming a groove in the surface so that the bottom surface of said groove is formed abnormally broken and rough, and building metal in the groove by spraying.

THOMAS R. ROSE.
HERMAN L. ENGLE.